2,771,456

FINISHING COMPOSITIONS COMPRISING AQUEOUS DISPERSIONS OF BUTADIENE-ACRYLONITRILE COPOLYMER AND POLYVINYL ALCOHOL

Moses Konigsberg, Roslyn Heights, and Frank Camps-Campins, Pelham, N. Y., assignors, by mesne assignments, to Jam, Wichita, Kans., a partnership No Drawing. Application July 3, 1952,
Serial No. 297,181

3 Claims. (Cl. 260—29.6)

This invention relates to finishing compositions containing synthetic plastic or resinous materials, and specifically to finishing compositions, in which the synthetic plastic substances are present in the form of dispersions or solutions in an aqueous medium.

An object of the present invention is to provide compositions of the above mentioned type, in which the basic synthetic plastic ingredient consists of co-polymers of butadiene and acrylonitrile, in combination with a compatible polyacrylate plastic and/or polyvinyl alcohol.

Another object of the present invention is to prepare compositions of the before-mentioned type, by which certain properties may be imparted to fibrous articles so as to render them non-abrasive, grease-proof, and having a suitable degree of hardness of finish.

A further object of the present invention is to provide mixed compositions of the above mentioned type, which are sufficiently stable on storage; can be easily applied to the desired base material and form a durable, stable finish on the latter.

Another object of the present invention, consists in providing aqueous compositions which contain co-polymers of butadiene and acrylonitrile in combination with other dispersed or dissolved synthetic plastics, and can be applied with particular advantage to fibrous boards, objects, or plates, preferably consisting of cellulosic fibres, forming stable and durable finishes on such fibrous products.

Other objects and the advantages of the invention will be apparent from the following specification which describes by way of example and without limitation some embodiments of the invention.

It has been found that compositions which have a very satisfactory penetrating power in the treatment of fibrous materials, particularly fibrous boards, and form valuable, stable, and resistant finishes on such materials are obtained by compounding aqueous dispersions of butadiene-acrylonitrile co-polymers with thermoplastic polymers of derivatives of acrylic or methacrylic acid and/or aqueous colloidal solutions of polyvinyl alcohol. The butadiene-acrylonitrile rubber latex dispersions are prepared in known manner by co-polymerizing butadiene and acrylonitrile in the desired proportion in aqueous medium in the presence of a catalyst and an emulsifier. A small amount of soap may be present in the dispersion in order to obtain satisfactory stability. The addition of a conventional wetting agent, e. g. an alkyl aryl sulfonate, to the dispersion is of advantage, because it facilitates penetration of the fibrous material by the dispersion and helps to prevent undesired coagulation of the dispersion. An antioxidant may also be present in the dispersion, in order to increase stability to oxidation accelerated by light or heat. The use of dispersions having a suitable pH value is necessary for good stability and it has been found that pH values in the range of 4.00–10.00 give satisfactory results. In order to adjust the pH value, the necessary amount of very dilute aqueous solution of sodium hydroxide can be mixed with the dispersion. If desired, a preservative agent can be incorporated in the compositions embodying the invention. For example the addition of a small amount of aqueous potassium cresylate solution proved to be satisfactory in order to obtain stability to fungi or bacteria. If desired, coloring agents, for example polytint black, phthalo cyanine green or blue, and the like, and/or accelerators, e. g. mercaptobenzothiazole or zinc diethyl dithiocarbamate, can be added to the compositions of the invention. Plasticizers may also be used, preferably in the form of aqueous emulsions which are miscible and compatible with the dispersed butadiene-acrylonitrile polymers. For example, plasticizers emulsified with water in the presence of a small amount of a water-soluble fatty acid soap, can be used.

It has been found useful to store the compositions of the present invention at temperatures not exceeding 60°–70° F. In mixing the ingredients to be compounded, said ingredients may be preferably in the form of aqueous solutions, suspensions, emulsions or slurries, and mixed with each other with gentle agitation. Immiscible liquids must be first converted into aqueous dispersions, or the like. The desired viscosity, plasticity, etc. of the compositions embodying the invention, are obtained by suitable adjustment of the concentration and pH of the dispersions and, if desired, by the addition of suitable modifying agents, e. g. plasticizers or a casein dispersion, or thickening agents, e. g. dispersions of methyl cellulose or carboxymethylcellulose. For preparing and/or diluting the compositions, preferably softened water is used.

The compositions of the invention can be applied to the fibrous materials or articles to be treated in any suitable manner, e. g. by coating, brushing, spraying or dipping. The compositions are preferably applied at slightly elevated temperatures, e. g. 75°–80° F. The fibrous materials or articles can be treated in wet or dry condition, and the amount of the finishing, coating or impregnating composition absorbed or taken up by the fibrous materials can be adjusted or modified by suitable selection of the concentration of the compositions and by the duration of treatment. The materials or articles treated are then dried, preferably first at ordinary room temperature in the air and subsequently at elevated temperature, for example 200°–250° F. During drying the compositions undergo curing.

The compositions of the invention may also be applied by mixing loose fibrous material with the compositions, precipitating the plastic material dispersed in the composition in conventional manner by the addition of a precipitating agent and forming the fibrous material thus treated to articles of desired shape.

Furthermore, instead of mixing the ingredients of the compositions and applying the mixture to the fibrous material or articles, the ingredients may also be applied to the fibrous material separately, e. g. by first immersing for example a fibrous cellulosic board in a co-polymerized dispersion of butadiene-acrylonitrile and subsequently immersing the resulting product in wet condition in a solution of polyvinyl alcohol. However, in general, this treatment in several steps has no advantages, and it is preferred to first mix the ingredients of the compositions and carry out treatment of the fibrous material or article with the resulting mixture in one step.

The ratio of butadiene to acrylonitrile in the compositions according to the invention amounts to about 85% to 50% of butadiene to 15% to 50% of acrylonitrile and ratios in the range of 80 to 55% of butadiene to 20 to 45% of acrylonitrile, are preferred.

The coatings, finishes or impregnations obtained with the compositions of the invention are highly resistant to oils, greases and solvents, as well as to high temperatures, they are flexible at low temperatures and resistant to ageing. It has been found that the individual ingredients of the compositions co-act with and improve each other in the final products which are superior in their properties to the additive characteristics of the individual products with regard to the beforementioned properties.

Example I 20 parts by weight of butadiene-acrylonitrile rubber latex of the acid-stable type, containing about 45% solids, are mixed with 30 parts by weight of an aqueous polyacrylate dispersion selected from the group hereinafter set forth containing 40–45% solids, and 40 parts by weight of aqueous colloidal solution of polyvinyl alcohol containing about 10% solids.

The pH of this composition is adjustable within the range of 4–10 and preferably amounts to about 6.5 to 7.5.

Example II 25 parts by weight of butadiene-acrylonitrile rubber latex of the acid-stable type, containing about 45% solids, are mixed with 35 parts by weight of an aqueous polyacrylate dispersion containing 40–45% solids, and 40 parts by weight of aqueous colloidal solution of polyvinyl alcohol containing about 10% solids. The pH is similar to that in Example I.

Example III 15 parts by weight of butadiene-acrylonitrile rubber latex of the acid-stable type, selected from the group hereinafter set forth containing about 45% solids, are mixed with 30 parts by weight of an aqueous polyacrylate dispersion containing 40–45% solids, and 55 parts by weight of aqueous colloidal solution of polyvinyl alcohol containing about 10% solids. The pH is similar to that in Example I.

The butadiene-acrylonitrile dispersion used in Examples I–III is a co-polymer of 80 to 70% by weight of butadiene and 20 to 30% by weight of acrylonitrile. Fibrous cellulosic boards treated with these dispersions by immersion in the above described manner show an excellent grease-proof finish.

Example IV 50 parts by weight of an aqueous butadiene-acrylonitrile rubber latex, which contains about 45% solids and is a co-polymer of butadiene and acrylonitrile in the proportion of 75 to 25%, are mixed with 50 parts by weight of an aqueous colloidal solution containing about 10% polyvinyl alcohol.

When applied by immersion to fibrous cellulosic boards in the above described manner, a hard grease proof finish is obtained.

Example V 25 parts by weight of an aqueous butadiene-acrylonitrile rubber latex, which contains about 45% solids and is a co-polymer of butadiene and acrylonitrile in the proportion of 75 to 25%, are mixed with 75 parts by weight of an aqueous colloidal solution containing about 10% polyvinyl alcohol.

When applied by immersion to fibrous cellulosic boards in the above described manner, a hard grease proof finish is obtained.

Example VI 60 parts by weight of an aqueous butadiene-acrylonitrile rubber latex, which contains about 45% solids and is a co-polymer of butadiene and acrylonitrile in the proportion of 75 to 25%, are mixed with 40 parts by weight of an aqueous colloidal solution containing about 10% polyvinyl alcohol.

When applied by immersion to fibrous cellulosic boards in the above described manner, a hard grease proof finish is obtained. Cellulosic material treated with compositions according to Examples V and VI are similar in their finish to the product obtained in Example IV. The pH of the compositions according to Examples IV—VI is in the range of 4 to 10.

Example VII 95 parts by weight of butadiene acrylonitrile rubber latex which contains about 45% solids and is a co-polymer of butadiene and acrylonitrile polymers in the proportion of 75 to 25% is mixed with 5 parts by weight of aqueous colloidal solution containing about 10% polyvinyl alcohol.

Example VIII 85 parts by weight of butadiene acrylonitrile rubber latex which contains about 45% solids and is a co-polymer of butadiene and acrylonitrile polymers in the proportion of 75 to 25% is mixed with 15 parts by weight of aqueous colloidal solution containing about 10% polyvinyl alcohol.

Example IX 99 parts by weight of butadiene acrylonitrile rubber latex which contains about 45% solids and is a co-polymer of butadiene and acrylonitrile polymers in the proportion of 75 to 25% is mixed with 1 part by weight of aqueous colloidal solution containing about 10% polyvinyl alcohol.

The compositions according to Examples VII–IX have preferably a pH of about 4 to 10 and they yield grease-proof, resilient finishes.

In each of the Examples I–IX, modifying ingredients, such as stabilizing agents, e. g. soap, wetting agents, antioxidants, preservatives, colors, accelerators, plasticizers, and/or thickening agents can be added to the compositions.

Example X

In order to produce a glossy finish, in addition to the ingredients described in Example I, 25 parts by weight of a 10% aqueous casein dispersion are added to the composition.

Example XI

One part by weight of a wetting agent, e. g. an alkyl aryl sulfonate, is incorporated in the composition described in Example I.

It will be understood that the present invention is not limited to the above described specific materials, proportions, steps and other details and can be carried out with various modifications. For example, the 25 to 75% by weight of the butadiene-acrylonitrile latex can be combined with 75 to 25% of polyvinyl alcohol solution in order to obtain hard finishes, and 75 to 99% by weight of butadiene-acrylonitrile latex can be combined with 25 to 1% of polyvinyl alcohol solution in order to obtain resilient finishes. These and other modifications can be made without departing from the scope of the invention as defined in the appended claims.

The term "fibrous cellulosic board" and "fibrous cellulosic plate" is used in the present application to include materials or articles obtained by forming in conventional manner cellulosic fibrous material to articles of the desired dimensions and shape, and to also include board or plates consisting of natural wood. The term "dispersion of polyacrylate" is used to denote dispersions which are prepared by emulsion polymerization and consist of polymers and co-polymers of acrylate and methacrylate derivatives such as for example methyl and ethyl acrylates and methacrylates.

What is claimed is:

1. A surface coating, impregnating and finishing composition consisting of a stable mixture of at least 15% of an aqueous dispersion which contains about 45% solids and in which the butadiene and acrylonitrile are co-polymerized in the proportion of 85 to 50% butadiene and 15 to 50% acrylonitrile, in mixture with not more than 75 parts of an aqueous solution containing 75% polyvinyl alcohol, 2. A composition according to claim 1, in which about 75–99 parts by weight of the butadiene acrylonitrile latex about 25 to 1 parts by weight of the polyvinyl alcohol solution are used.

3. A surface coating impregnating and finishing composition, consisting of a stable mixture of 95 parts by weight of butadiene acrylonitrile rubber latex which contains about 45% solids and contains butadiene and acrylonitrile co-polymerized in the proportion of 75 to 25%, in mixture with 5 parts by weight of aqueous colloidal solution containing about 10% polyvinyl alcohol.

References Cited in the file of this patent

UNITED STATES PATENTS

| | | |
|---|---|---|
| 2,138,073 | Schweitzer | Nov. 29, 1938 |
| 2,346,755 | Hemming | Apr. 18, 1944 |
| 2,416,232 | Soday | Feb. 18, 1947 |
| 2,482,237 | Berglund | Sept. 20, 1949 |
| 2,512,697 | Te Grotenhuis | June 27, 1950 |
| 2,538,779 | Harrison | Jan. 23, 1951 |

FOREIGN PATENTS

| | | |
|---|---|---|
| 579,083 | Great Britain | July 23, 1946 |
| 644,022 | Great Britain | Oct. 24, 1950 |

OTHER REFERENCES

Rubber Age, New York, July 1951, vol. 69, issue 4, page 433.